Oct. 7, 1947.   F. A. DE PUYDT   2,428,486
FILTER WITH TEMPERATURE CONTROL MEANS
Filed March 16, 1942

INVENTOR.
Frank A. DePuydt
BY Corey and Fletcher

Patented Oct. 7, 1947

2,428,486

UNITED STATES PATENT OFFICE 2,428,486

FILTER WITH TEMPERATURE CONTROL MEANS

Frank A. De Puydt, Des Moines, Iowa

Application March 16, 1942, Serial No. 434,868

4 Claims. (Cl. 210—122.5)

The principal object of my invention is to provide a filter element which permits the continuous filtering of a liquid and which is equipped with a sectional filter element contained within a sleeve wherein sections of the filter element may be ejected as they become clogged.

A further object of this invention is to provide a filtering element and system wherein adequate control of temperature is maintained to permit the filtering of the liquid while at the same time preventing oxidation of such liquids as oil.

A still further object of this invention is to provide a means for and method of filtering a fluid that is economical in manufacture, durable and efficient in use, and one that may be used with compounded oils.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Heretofore, it has been necessary to utilize costly filtering elements in continuous flow or bulk filtering units. Such units were either thrown away after the usable surface had become clogged to such a degree as to prevent entrance of the fluid into the filter, or had to be cleaned by a reverse flow or bath system. Both of these cause interruption of operation for long periods of time and in addition it was necessary to use costly filtering elements in order to attempt to prolong their life. The most common type of filtering unit used is the porous clay type which was useless when the surface had become clogged thereby presenting a costly replacement problem. Furthermore, such units could not be used in filtering compounded oils because they removed the compound materials. Elaborate systems had to be set up for filtering large quantities of fluid, especially oil, and require a skilled operator for their maintenance at all times. I have overcome such disadvantages as will be appreciated and as will hereinafter be more fully set forth.

Figure 1:
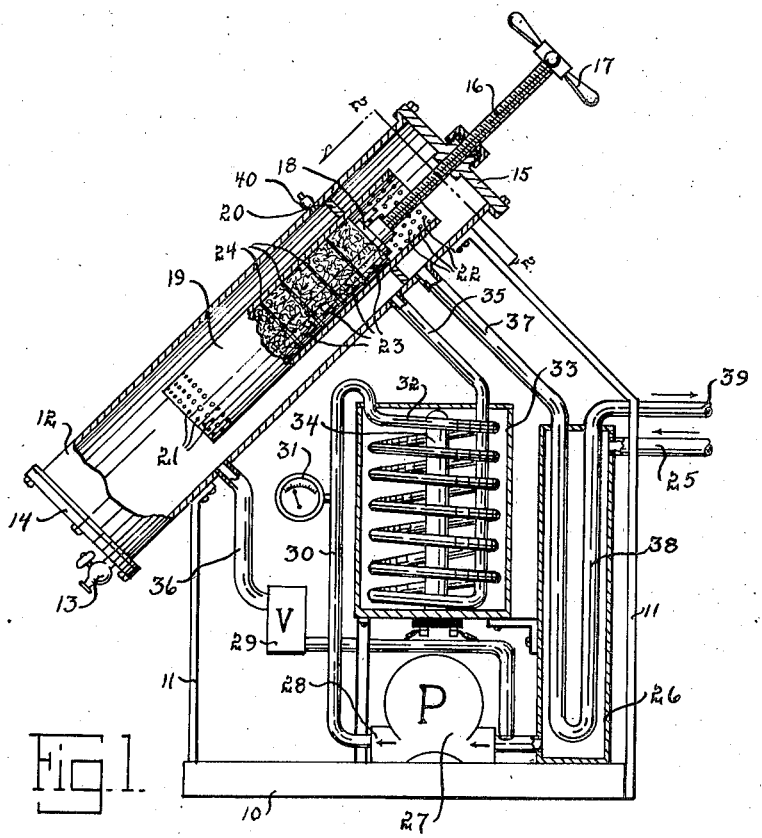
Fig. 1 is a side view of the complete filtering system with portions cut away to more fully illustrate its inner structure.
Figures 2, 3:
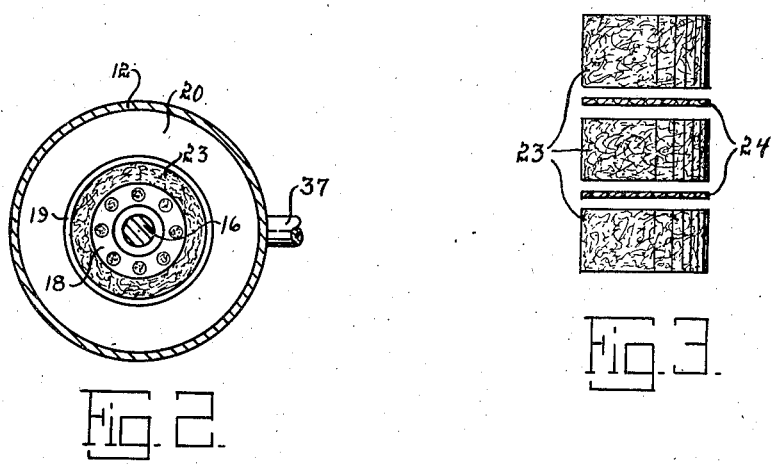
Fig. 2 is a top cross sectional view of the filtering unit taken on the line 2—2 of Fig. 1.
Fig. 3 is a side elevational view of the composition of the sectional filtering element.

Referring to the drawings, I have used the numeral 10 to indicate a base member. The numeral 11 indicates a frame for supporting a casing 12, which houses the filtering element of my device. As will be noted, this casing 12 is disposed at an angle to the horizontal in order to permit sludge to settle to the bottom portion of the casing, where it may be removed through a petcock 13 or through a removable base plate 14 as shown in Fig. 1. The upper end of the casing or cylindrical housing 12 is closed by a cap member 15, that is also detachable from the housing 12. The numeral 16 indicates a threaded shaft placed through a packing gland and the cap 15 and having on its outer end a hand wheel 17 and on its inner end a pressure disk, plate or the like 18, the function of which will hereinafter be described. I have used the numeral 19 to indicate an inner cylinder suspended within the casing 12 and separating it into an upper and lower compartment through the medium of a spacing disk or plate 20. The cylinder is open at both of its ends and has a plurality of holes 21 about its lower open end and a plurality of holes 22 about its upper end as shown in Fig. 1 of the drawings. The numerals 23 indicate a plurality of sections of filtering material such as cotton waste and the like, each section of which is separated by a spacer disk 24 which may be of light cloth or similar material. The purpose of the spacer disks 24 is to permit the filtering sections 23 to separate from each other. A plurality of these sections stacked in the manner shown in Figs. 1 and 3 are placed in the cylinder 19 and as the bottom filter 23 is filled with sludge so that it is no longer efficient, the hand wheel 17 is operated which, through the medium of the shaft 16 and plate 18, ejects a clogged filter element 23 from the bottom of the cylinder 19 and into the lower portion of the cylinder or housing 12. Thus, a new filter is presented and the used filters can be permitted to accumulate in the bottom of the housing 12 and removed therefrom when necessary. To utilize my filters and obtain a high degree of efficiency therefrom, I have provided an oil heating and exchange system which I now will describe. The numeral 25 designates an inlet pipe in communication with a heat exchange casing 26. The numeral 27 indicates a pump having its inlet in communication with the casing 26 and its outlet 28 in communication with one end of a pipe 30. The numeral 31 indicates a pressure gauge placed in the pipe 30. The other end of the pipe 30 is in communication with a coil 32 which is placed within a housing 33. This housing may be filled with a suitable fluid and has therein an electric heat unit 34. The outlet of the coil 32 is in communication with the upper end of the lower chamber of the casing 12. This inlet pipe I have designated by the numeral 35. The lower end of the casing 12 is in communication, through a pipe 36 with the by-pass valve 29 as shown. The other side of the by-pass valve 29 is in communication with the inlet of the pump 27. The numeral 37 indicates a pipe in communication with the upper chamber of the casing 12 extending down into a coil 38 placed within the exchange chamber 26 and it is thence in communication with the filtered oil supply outlet 39 as shown in Fig. 1.

To prevent an air lock in the chamber 12, I have provided an air relief valve 40.

The practical operation of my device is as follows: The oil or other liquid, from a bulk tank or the like enters the chamber 26 through the pipe 25 and is then pumped through the coil 32. This coil 32 is submerged in a liquid and heated by the thermostatically controlled element 34. The oil then passes into the upper end of the chamber 12. During the initial flow of oil into the filtering unit the temperature of the oil may not be high enough for sufficient filtering in which case a pressure will be built up within the casing which will open the by-pass valve 29 and permit the oil to flow in a complete circuit until the filtering element and oil is warmed to the right temperature. This temperature is maintained at a level occasioning the most efficient separation of water and dirt and therefore much of the foreign matter in the unfiltered oil settles to the bottom of the housing 12 before the oil contacts the filter proper. The warm oil passes through the filtering elements 23, passing through succeedingly cleaner filters and into the upper end of the housing 12 where it flows out through the pipe 37 which extends into the coil 38. By this structure the warm oil in the pipe 37 loses its heat to the cool oil within the chamber 26 and thus passes out through the pipe 39 at a temperature low enough to prevent oxidation of the oil.

The use of the coil 32 submerge within the liquid and heated by the electric element 34 prevents destructive temperatures which are normally encountered when oil is subjected to a heating element directly and prevents the cracking of the oil. The waste sections 23 may be loosely placed in the cylinder 19 but when the pressure is built up within the system this waste packs tightly, inasmuch as it is the general practice to keep the operating pressure at approximately seventy-five pounds. By using cotton waste packing instead of the common clay type filter, compounded oil may be filtered without removing the compounding elements. As is well known, the entrance surface of a filter accumulates the initial coating of sludge and foreign materials and when this is clogged it renders the rest of the filter useless. With my device, the filtering elements may be ejected one at a time to present a new filtering surface.

It will be noted from Fig. 1 that a bucket may be placed underneath the lower end of the casing 12, the plate 14 removed, and the accumulated sludge and spent filtering elements 23 may be removed from the casing. The top portion may be removed from the casing for inserting additional filtering elements and the complete filtering element may be used in multiple so that one filtering unit will be in operation while the other is being changed.

Thus, it will be seen that I have provided a filtering element and system that fulfills all of my objects, that utilizes sections of cotton waste or other inexpensive material, that may be used for filtering compounded oils or the like, that heats the oil for efficient filtering and then cools the oil after filtering to prevent oxidation thereof. My device offers many advantages not heretofore found in filtering units.

Some changes may be made in the construction and arrangement of my improved device without departing from the real spirit and purpose of my invention, and it is my intention to cover by my claims any modified forms of structure or use of mechanical equivalents which may be reasonably included within their scope.

I claim:

1. In a filter unit, a casing, an upper and lower compartment in said casing a cylinder inside said casing having one end opening into said lower compartment and its other end opening into said upper compartment, a wall disposed between the casing and the cylinder for separating said compartments, a plurality of free filtering units in said cylinder, a means comprised of a threaded rod operatively mounted in the upper portion of said casing for ejecting the filtering units from the bottom end of said cylinder, an inlet pipe in communication with the lower compartment of said casing, and an outlet pipe in communication with the upper compartment so that a liquid entering said lower compartment must flow through said filtering elements to reach said upper compartment and said outlet pipe.

2. In a liquid filter, an inlet pipe, a heat exchange casing in communication with said inlet pipe, a pump having its inlet in communication with said heat exchange casing, a coil in communication with the outlet from said pump, a container for liquid in which said coil is submerged, a means for heating said liquid about said coil, a housing having an inlet portion in communication with said coil, a plurality of filter elements in said housing, an outlet conduit for said housing so positioned that a liquid entering from said coil must pass successively through said filter elements to reach said outlet conduit, means operable at will for ejecting the filter element adjacent said inlet portion, said outlet conduit extending through said heat exchange casing, and a pressure actuated by-pass valve having one side in communication with the inlet portion of said housing and its other end in communication with the inlet of said pump to recirculate the liquid to be filtered through said heating means.

3. In a filtering apparatus, the combination of a filter having an inlet chamber and an outlet conduit, a source of liquid, a liquid heating device in communication with said liquid source and connected to discharge into said inlet chamber, means for creating flow of liquid from said source through said heating device and said filter, means comprising a return conduit in communication with said chamber and said heating device but independent of said outlet conduit, and control means for recirculating said liquid when a predetermined minimum flow exists through said filter.

4. In a filtering apparatus, the combination of a filter having an inlet chamber and an outlet conduit, a liquid heating device connected to discharge into said chamber, a pump having an inlet conduit connected to a source of unfiltered liquid and connected to discharge into said heating device, a return conduit connecting the inlet chambers of said filter with the inlet conduit of said pump and independent of said outlet conduit, and a pressure operated valve disposed in said return conduit, whereby excessive pressure in the filter inlet will cause recirculation of liquid from said chambers through the pump and heating device.

FRANK A. DE PUYDT.

REFERENCES CITED

The following references are of record in the file of this patent:

UNITED STATES PATENTS

| Number | Name | Date |
|---|---|---|
| 435,971 | Jewell et al. | Sept. 9, 1890 |
| 1,190,538 | Garrity et al. | July 11, 1916 |
| 53,905 | Van der Weyde | Apr. 10, 1866 |
| 1,806,553 | Babitch | May 19, 1931 |
| 2,161,964 | La Brecque | June 13, 1939 |
| 454,340 | Fulton | June 16, 1891 |
| 476,671 | Moeller | June 7, 1892 |
| 620,621 | Veazie | Mar. 7, 1899 |
| 847,518 | Shiltz | Mar. 19, 1907 |
| 1,367,517 | Hostettler | Feb. 1, 1921 |
| 2,302,469 | Patterson | Nov. 17, 1942 |
| 981,031 | Stitzel | Jan. 10, 1911 |
| 1,428,205 | Barry | Sept. 5, 1922 |
| 2,068,394 | Burckhalter | July 21, 1932 |
| 2,108,798 | Dalrymple | Nov. 3, 1933 |
| 2,230,174 | Beale | Jan. 28, 1941 |

FOREIGN PATENTS

| Number | Country | Date |
|---|---|---|
| 9,953 | Great Britain | 1898 |